Aug. 22, 1944.   H. A. KUNTZ   2,356,411
PLASTIC WASHING APPARATUS
Filed Feb. 11, 1942   4 Sheets-Sheet 1
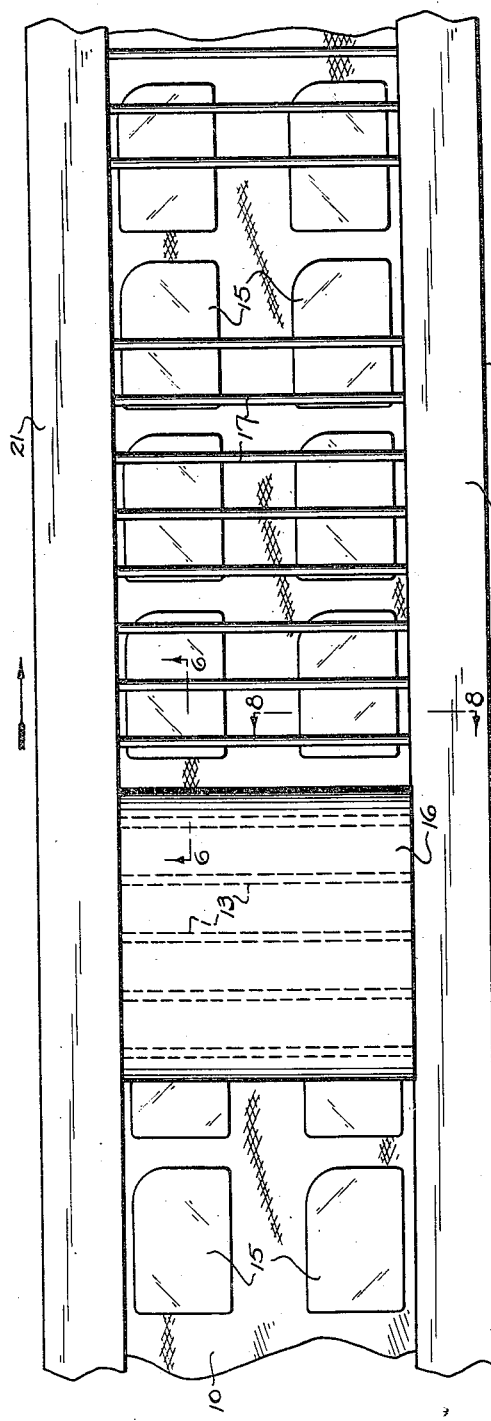
Inventor
HARRY A. KUNTZ.
By Frank Fraser
Attorney Inventor
HARRY A. KUNTZ.

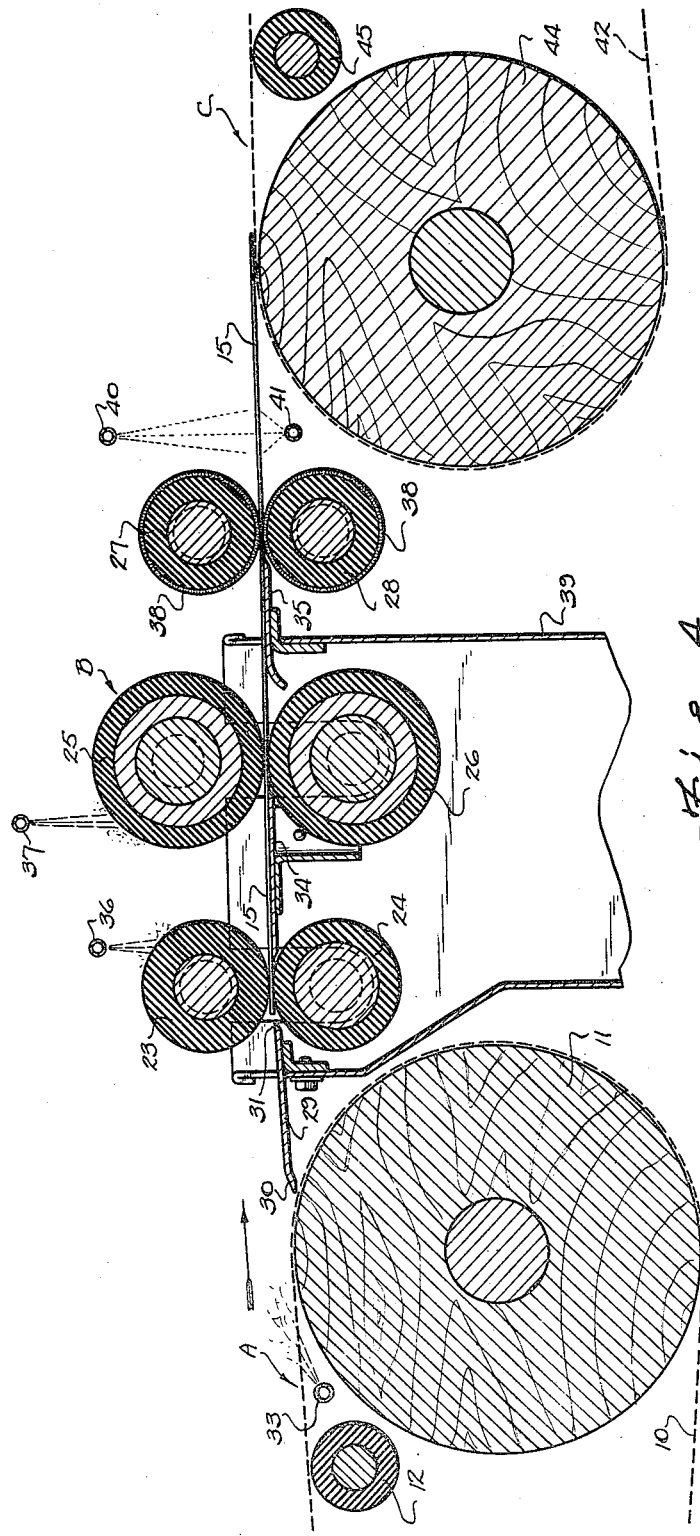
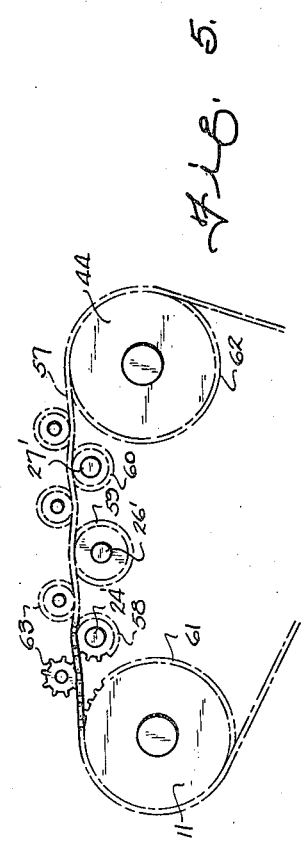

Aug. 22, 1944.        H. A. KUNTZ        2,356,411
PLASTIC WASHING APPARATUS
Filed Feb. 11, 1942        4 Sheets-Sheet 4

Inventor
HARRY A. KUNTZ.
By Frank Fraser
Attorney

Patented Aug. 22, 1944

2,356,411

UNITED STATES PATENT OFFICE 2,356,411

PLASTIC WASHING APPARATUS

Harry A. Kuntz, Toledo, Ohio, assignor to Libbey-Owens-Ford Glass Company, Toledo, Ohio, a corporation of Ohio Application February 11, 1942, Serial No. 430,411

4 Claims. (Cl. 15—102)

The present invention relates to apparatus for washing and drying sheets of material and more particularly for the treatment of soft, flexible sheets of plastic such as are used in the manufacture of laminated safety glass.

At the present time, it is customary in manufacturing laminated safety glass to use as the plastic interlayer a sheet of synthetic resin, such as, for example, a polyvinyl acetal resin. The plastic is ordinarily received by the safety glass manufacturer in relatively large rolls and is subsequently conditioned, cut into sheets of the desired size, and then washed before being assembled with the glass sheets.

Such plastic is usually so plasticized that it is relatively soft and tacky and quite difficult to handle. In order to overcome difficulties in handling during shipment, etc., the plastic manufacturers have resorted to roughening the surfaces of the plastic sheeting and powdering the plastic with sodium bicarbonate. The coating of soda remains on the plastic during shipment, conditioning, and the cutting thereof into sheets for assembly with the glass sheets. It is the usual practice after cutting the plastic to store it with the soda coating thereon, and then remove the soda by washing just prior to the assembly of the plastic and glass.

It is the aim of this invention to provide an improved form of apparatus for washing and drying the soft flexible sheets of plastic used in the manufacture of laminated safety glass to remove the coating of soda therefrom before assembly of the glass and plastic.

Another object of the invention is the provision of an improved form of apparatus which is of relatively simple construction and easily operated at a comparatively low cost for effecting the washing and drying of the plastic sheets in a continuous manner.

A further object of the invention is the provision of an improved form of apparatus including generally a washing section, a wiping section, and a drying section through which the sheets of plastic are successively passed, and characterized by the provision of novel means for causing the plastic sheets to "set" and become self-supporting after washing and for facilitating the passage thereof through the several sections of the apparatus.

Other objects and advantages of the invention will become more apparent during the course of the following description, when taken in connection with the accompanying drawings.

In the drawings, wherein like numerals are employed to designate like parts throughout the same:

Fig. 1 is a plan view of the washing section of apparatus constructed in accordance with the invention;

Fig. 2 is a plan view of the wiping section and drying section which follow the washing section;

Fig. 4 is a vertical longitudinal section through the wiping section taken substantially on line 4—4 of Fig. 2;

Fig. 5 is a diagrammatic view of the driving means for the apparatus;

Fig. 7 is a plan view of a portion of the endless conveyor for the sheets of plastic;

Figure 3:
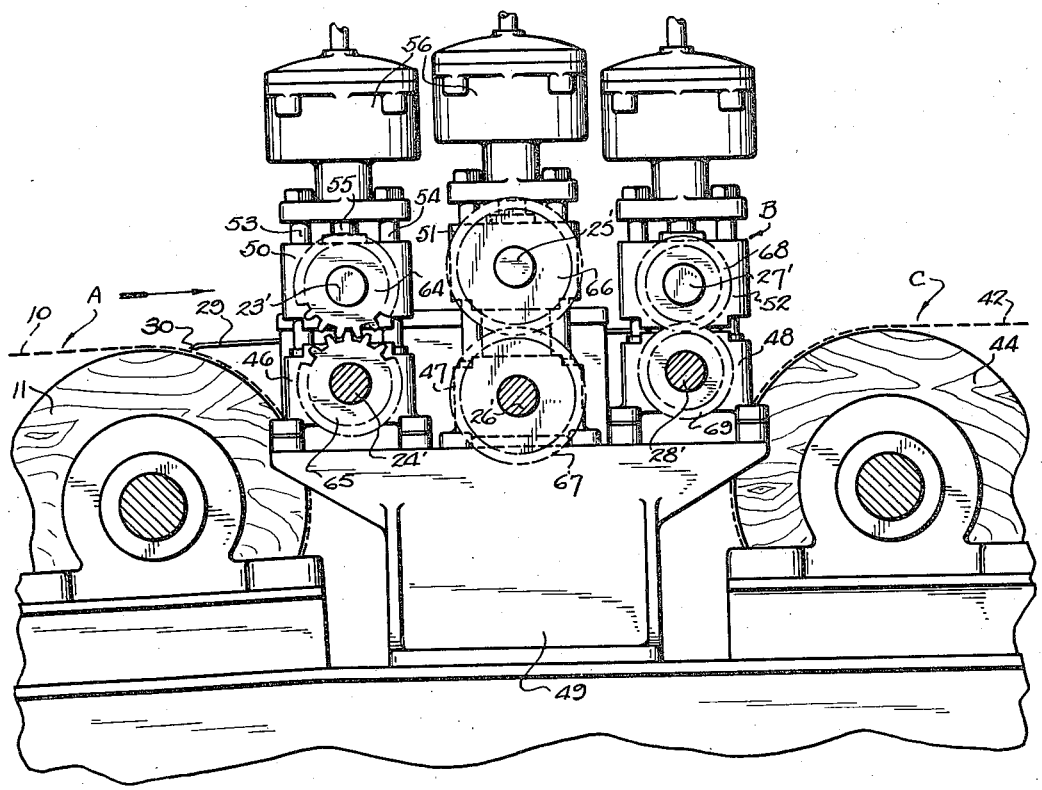
Fig. 3 is a side elevation of the wiping section of the apparatus.
Figure 6:
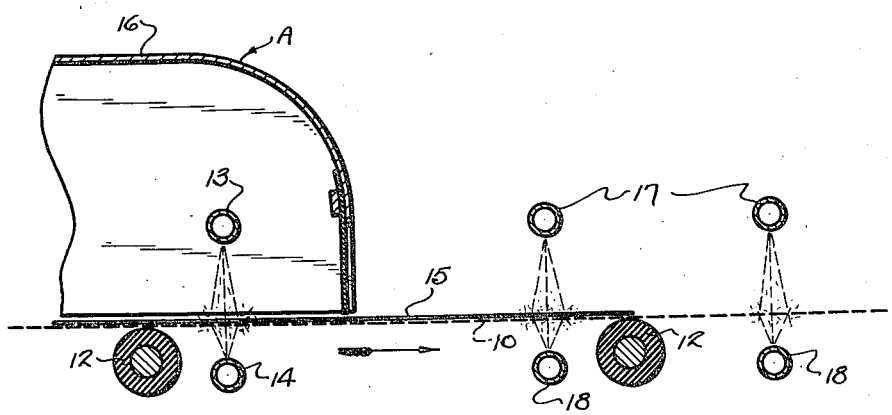
Fig. 6 is a detail section through the washing section taken substantially on line 6—6 of Fig. 1.
Figure 8:
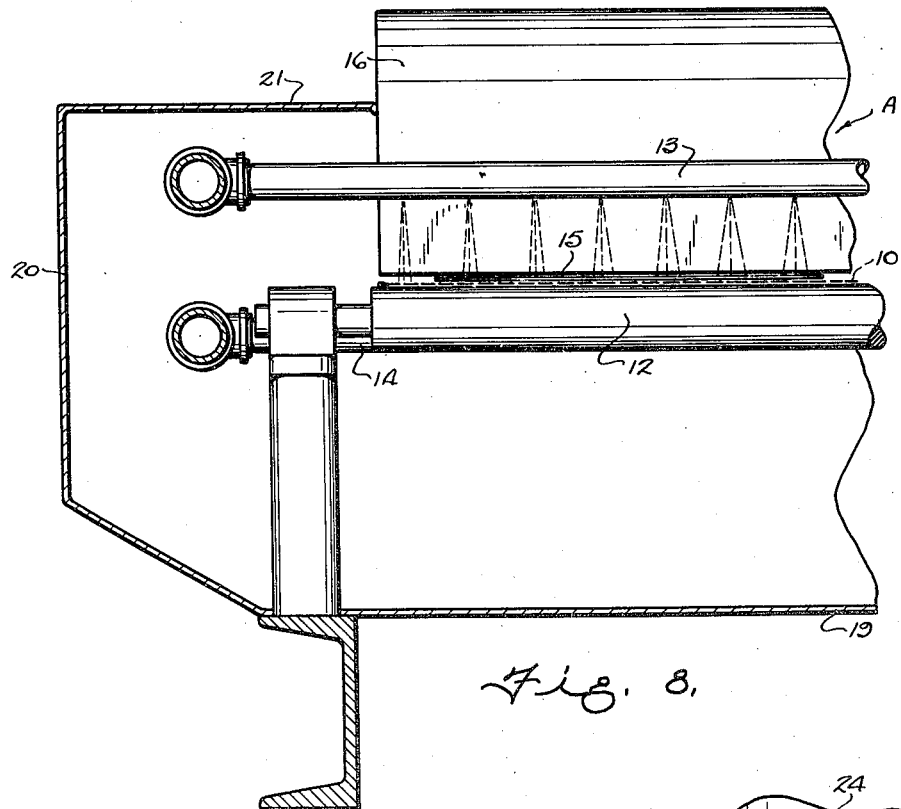
Fig. 8 is a transverse section taken substantially on line 8—8 of Fig. 1.
Figure 9:
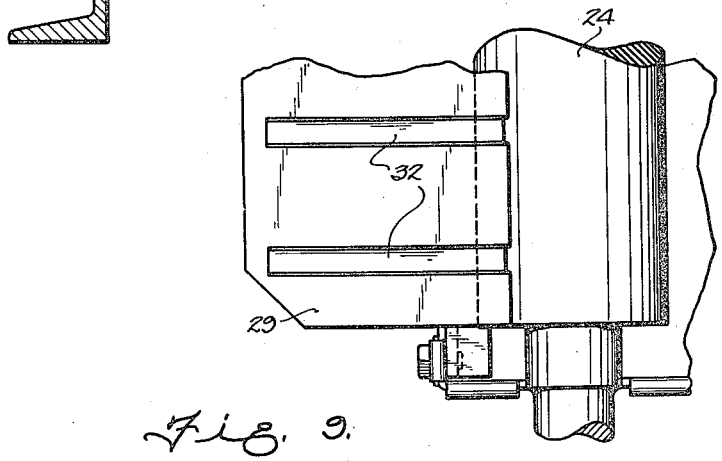
Fig. 9 is a plan view of a portion of the apparatus.

Referring now to the drawings, the apparatus comprises generally a washing section A, wiping section B, and drying section C arranged in substantial alignment with one another and adapted to successively receive the sheets of plastic or the like to be treated.

The washing section A comprises a substantially horizontally disposed endless conveyor 10 in the form of a wire belt (Fig. 7) trained at each end of its loop about a drum 11 and having its upper run supported by a plurality of spaced transverse rollers 12. Extending transversely of the conveyor 10 adjacent the forward end thereof are a plurality of spray pipes 13 and 14 positioned respectively above and beneath the upper run of said conveyor for directing a washing fluid against opposite surfaces of the sheets of plastic 15 as they are carried along upon the conveyor. The washing fluid directed upon the plastic sheets from the spray pipes 13 and 14 preferably consists of hot water and it is suggested, by way of example, that the water have a temperature of approximately 110 degrees Fahrenheit. In order to prevent undesirable scattering of the water sprays, there may be arranged over the pipes 13 and 14 a suitable hood 16.

Also extending transversely of the conveyor 10 above and beneath the upper flight thereof are additional spray pipes 17 and 18 respectively which serve to direct a fluid spray upon the plastic sheets 15 after they pass beyond washing pipes 13 and 14. The spray pipes 17 and 18 may be said to form a chilling zone, as the water discharged therefrom is not heated but on the contrary is relatively cold. For instance, ordinary well water having a temperature of approximately 50 to 60 degrees Fahrenheit has been used. When the plastic sheets are subjected to the hot water from the spray pipes 13 and 14, they become very soft and flexible and the purpose of the spray pipes 17 and 18 is to chill the plastic and cause it to attain a desired stiffness or rigidity so that it will pass through the wiping and drying sections of the apparatus without trouble. In other words, the cold water causes the softened plastic to "set" and become self-supporting whereby its passage through the apparatus is greatly facilitated. Arranged beneath the endless conveyor 10 and extending preferably throughout the length thereof, to catch the water from the spray pipes 13, 14, 17 and 18, is a receptacle or pan having a bottom 19, opposite vertical side walls 20, and inwardly directed top flanges 21 and 22.

When the sheets of plastic 15 leave the endless conveyor 10, they pass to the wiping section B which includes a pair of receiving rolls 23 and 24, a pair of squeegee rolls 25 and 26, and a pair of wiping or blotting rolls 27 and 28 disposed in substantially horizontal alignment with one another. To facilitate the passage of the plastic sheets from the conveyor 10 to the receiving rolls 23 and 24, there is provided a stationary apron 29 in the form of a metal plate having its outer edge 30 disposed above the endless conveyor and terminating closely adjacent the surface thereof. The outer edge 30 of the apron is also preferably tapered to provide a relatively sharp edge so that the plastic sheets will slide freely onto the said apron and will not tend to follow the conveyor around the drum 11. The sliding of the sheets of plastic from the conveyor onto the apron is also facilitated by the sprays of cold water from the pipes 17 and 18 which first cause the "setting" of the plastic to give it the required stiffness or rigidity. The inner edge 31 of the apron 29 is received between the receiving rolls 23 and 24.

For the purpose of reducing the area of contact between the plastic sheets 15 and apron 29 whereby to lessen the drag on the plastic, the upper surface of the apron may be provided with a plurality of elongated recesses or grooves 32 extending in the direction of travel of the plastic. To further facilitate the passage of the plastic sheets from the conveyor onto the apron, there may be positioned beneath the upper run of said conveyor, and as close to the apron as possible, a spray pipe 33 which serves to wet or lubricate the plastic just before it reaches the apron to cause it to slide more freely thereover. Arranged between the receiving rolls 23—24 and squeegee rolls 25—26 is a stationary plate 34 for supporting the plastic sheets as they pass therebetween, while a second plate 35 is provided for supporting the plastic between the squeegee rolls 25—26 and wiping rolls 27—28.

As the sheets of plastic 15 pass from the receiving rolls 23 and 24 to the squeegee rolls 25 and 26, they are further chilled by water from the spray pipes 36 and 37 to increase the rigidity or stiffness of the plastic sheets, so that they will not buckle or lose their shape when subjected to the squeegee rolls 25—26 and wiping rolls 27—28 and also to prevent the forward edges of the sheets from following around the lower rolls 26 and 28. The water from the spray pipes 36 and 37 is preferably refrigerated and may be of a temperature in the neighborhood of 35 to 40 degrees Fahrenheit. The squeegee rolls 25 and 26 act in the usual manner of such rolls to remove the water from the opposite surfaces of the plastic sheets, while the rolls 27 and 28 act to substantially dry the sheets and for this purpose may be provided with a suitable fabric covering 38. On the other hand, the receiving rolls 23—24 and squeegee rolls 25—26 are preferably rubber-covered. The refrigerated water from spray pipes 36 and 37 is preferably recirculated and to this end there may be provided beneath the rolls 23—24 and 25—26 a receptacle 39 for receiving the water and conveying it to a suitable recirculating and refrigerating system.

As the plastic sheets 15 pass beyond the wiping or blotting rolls 27 and 28, they are first subjected to jets or sprays of compressed air from the pipes 40 and 41, after which they pass onto the upper run of the substantially horizontal endless conveyor 42 of drying section C which carries said sheets through a drying chamber 43. In passing through the drying chamber 43, the plastic is adapted to be thoroughly dried and this may be accomplished by simply circulating atmospheric air through said chamber. The endless conveyor 42 may also consist of a wire belt trained at each end of its loop about a drum 44 and having its upper run supported by a plurality of rollers 45.

It is preferred that the upper rolls 23, 25 and 27 in the wiping section B be yieldably urged toward the respective lower rolls 24, 26 and 28 and further that all of said rolls, together with the endless conveyors 10 and 41, be driven in unison from a common drive means. To this end, the shafts 24', 26' and 28' of the lower rolls 24, 26 and 28 respectively are journaled at their opposite ends in fixed bearings 46, 47 and 48 mounted upon a casting 49, while the shafts 23', 25' and 27' of the upper rolls 23, 25 and 27 respectively are journaled at their opposite ends in vertically movable bearings 50, 51 and 52. Each of the movable bearings 50, 51 and 52 is slidably mounted upon vertical posts 53 and 54 carried by the respective stationary bearing and each movable bearing is further provided with a vertical rod 55 which passes upwardly into an air cylinder 56 and carries the usual plunger (not shown) at the upper end thereof. By proper operation of the air cylinders 56, the upper rolls 23, 25 and 27 can be yieldably urged toward the lower rolls 24, 26 and 28. Each air cylinder 56 can be supported upon the respective vertical posts 53 and 54.

The shafts 24', 26' and 28' for the lower rolls 24, 26 and 28 are positively driven by a sprocket chain 57 passing over sprockets 58, 59 and 60 keyed to said shafts 24', 26' and 28' respectively; said sprocket chain also being trained about sprockets 61 and 62 keyed to the shafts of drums 11 and 44 of conveyors 10 and 42 respectively. A plurality of idler sprockets 63 are provided to maintain the sprocket chain 57 in engagement with the sprockets 58, 59 and 60. The upper rolls 23, 25 and 27 are driven from the respective lower rolls 24, 26 and 28 by the intermeshing gears 64—65, 66—67 and 68—69, whereby the receiving rolls, squeegee rolls, and drying rolls will be driven in unison and also in unison with the endless conveyors 10 and 41.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. An apparatus for treating flexible sheets of plastic or the like, comprising a washing section and a wiping section, an endless conveyor for supporting the sheets in a flat condition and for carrying them through said washing section, and a flat stationary apron positioned to receive the sheets from said endless conveyor and over which said sheets pass to said wiping section, said apron being provided upon its upper surface with a plurality of grooves extending in the direction of travel of the plastic sheets to reduce the area of contact between said sheets and apron.

2. An apparatus for treating flexible sheets of plastic or the like, comprising a washing section including an endless conveyor for supporting the sheets in a flat condition and for carrying them forwardly and a wiping section including a pair of squeegee rolls for receiving the sheets therebetween from said washing section, and a flat stationary apron positioned to receive the sheets from said endless conveyor and over which said sheets pass to said squeegee rolls, said apron being provided upon its upper surface with a plurality of grooves extending in the direction of travel of the plastic sheets to reduce the area of contact between said sheets and apron.

3. An apparatus for treating flexible sheets of plastic or the like, comprising a washing section including an endless conveyor for supporting the sheets thereupon in a flat condition and for carrying them forwardly and a wiping section including a pair of squeegee rolls and a pair of wiping rolls, and a flat stationary apron positioned to receive the sheets from said endless conveyor and over which said sheets pass to said squeegee rolls and thence to said wiping rolls, said apron being provided upon its upper surface with a plurality of grooves extending in the direction of travel of the plastic sheets to reduce the area of contact between said sheets and apron.

4. An apparatus for treating flexible sheets of plastic or the like, comprising a washing section and a wiping section, an endless conveyor in the form of a wire belt for supporting the sheets thereupon in a flat condition and for carrying them through said washing section, and a stationary apron in the form of a flat metal plate positioned to receive the sheets from said conveyor and over which said sheets pass to said wiping section, said metal plate having its forward edge disposed above the endless conveyor closely adjacent the surface thereof.

HARRY A. KUNTZ.